July 8, 1924.
J. HAYES
AUTOMOBILE AIR WHEEL
Filed Sept. 25, 1922
1,500,317
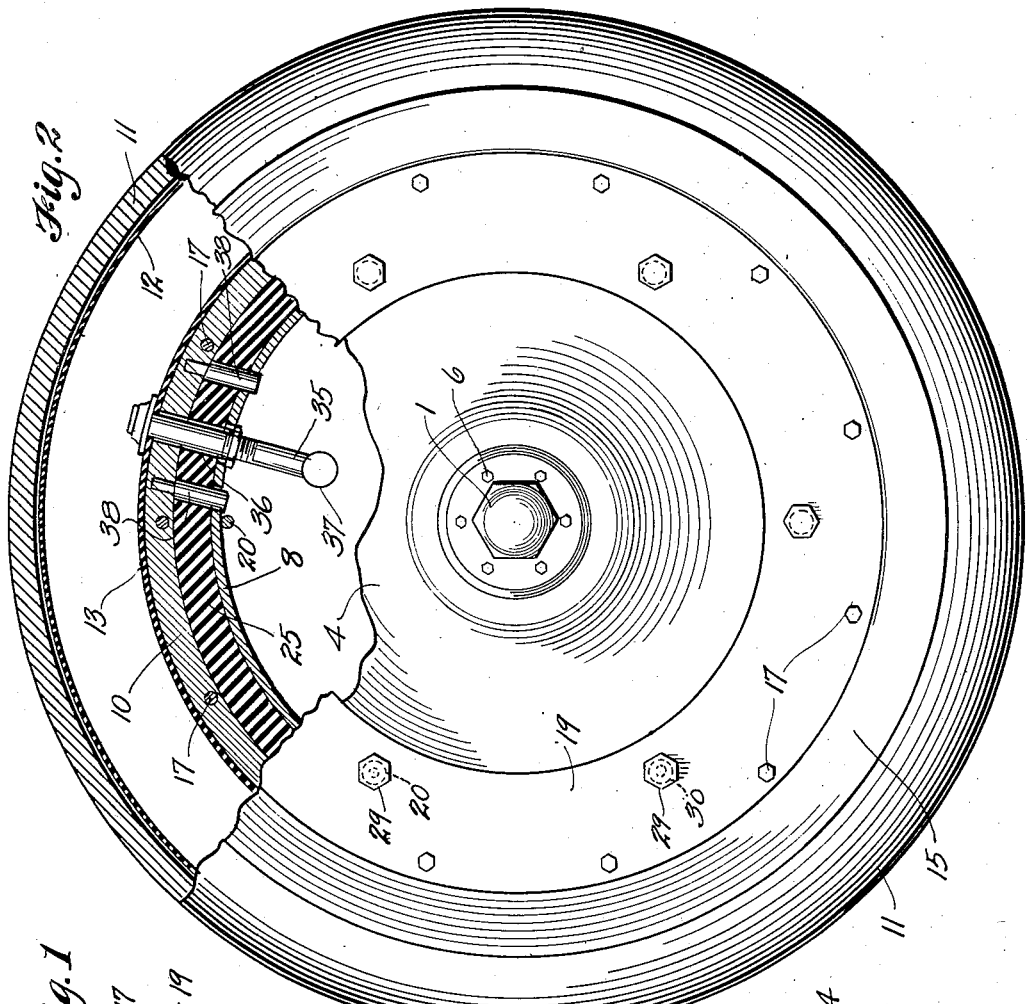
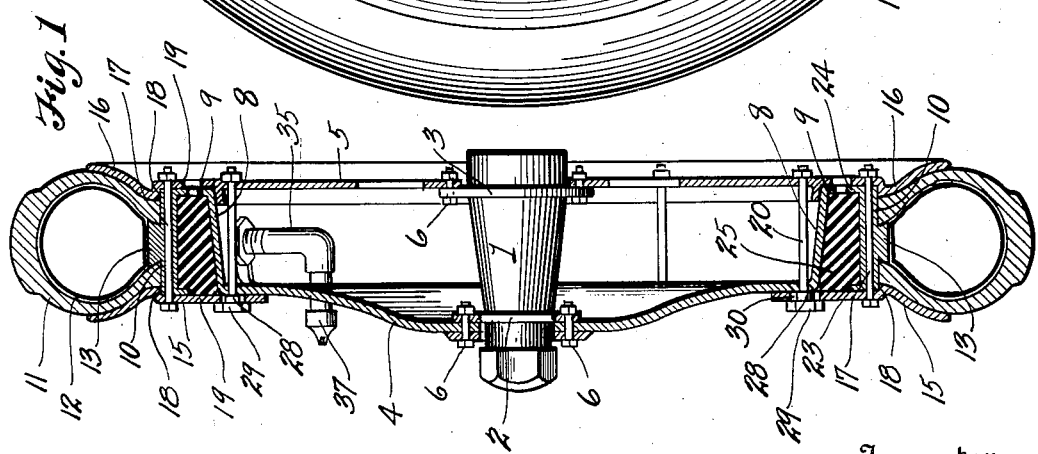
Inventor
JEREMIAH HAYES
By his Attorney Patented July 8, 1924.

1,500,317

UNITED STATES PATENT OFFICE.

JEREMIAH HAYES, OF EVERETT, WASHINGTON.

AUTOMOBILE AIR WHEEL.

Application filed September 25, 1922. Serial No. 590,393.

*To all whom it may concern:*

Be it known that I, JEREMIAH HAYES, a citizen of the United States, residing at Everett, in the county of Snohomish and State of Washington, have invented a new and useful Improvement in Automobile Air Wheels, of which the following is a specification.

This invention relates to vehicle wheels and more particularly to improvements in the construction of wheels of that class known as "disk wheels" and which are especially adapted for use on automobiles and similar vehicles.

It is the principal object of this invention to provide a disk wheel with a demountable rim for a pneumatic tire; and wherein a cushioning ring is disposed between the disk body of the wheel and the tire base for the purpose of adding resiliency to the wheel and for absorbing shock and strain on the parts incidental to travel over rough and uneven surfaces.

It is also an object of the invention to provide a rim or tire base of novel construction, especially useful, when straight side tires are used, for preventing them from being demounted if sufficiently inflated.

Another object resides in the construction of the tire retaining flanges for the protection of the casing if the wheel is used while the tire is not sufficiently inflated.

Other objects of the invention reside in the details of construction of the various parts and in their combination whereby a substantial, and desirable wheel is provided.

In accomplishing the objects of the invention, I have provided the improved details of construction, the preferred forms of which are illustrated in the accompanying drawings, wherein—

Figure 1 is a central sectional view of a wheel constructed in accordance with the present invention.

Figure 2 is an outside view of the same, a part being shown in section for better illustrating the arrangements of parts.

Referring more in detail to the drawings—

1 designates a wheel hub provided with annular spaced apart flanges 2 and 3 to which disks 4 and 5, which form the body portion of the wheel, are secured by a plurality of bolts 6. The disk 5, which is at the inner side of the wheel, is shown as being flat, while the outer disk 4 is preferably cupped outwardly at its center in order to enhance the appearance of the wheel.

At its outer edge, the disk 4 has an inwardly turned annular rim 8 which is formed slightly on a bevel in order that the demountable rim may be more easily applied to or removed therefrom. This extends inwardly to the disk 5 and there has an outwardly turned flange 9 which seats tightly against the face of the inner disk.

The demountable portion of the wheel comprises a rim or tire base 10 on which a pneumatic tire is mounted; said tire comprising a casing 11 and an inner tube 12. Formed on the tire base, centrally about its outer face is a dove-tailed rib 13 against which the opposite edges of the casing are fitted in a dove-tailed connection to prevent any possible demounting of the casing while in use. The casing is held on the tire base by means of ring plates 15 and 16 that are secured respectively to the outer and inner edges of the rim by means of a plurality of bolts 17 that are extended through these parts. The outer portions of these plates are made to fit against, and to conform to the shape of the opposite sides of the lower half of the tire casing and retain its edges tightly seated against the dove-tailed rib 13 on the tire base. Both rings also have annular seats 18 fitted against the edges of the tire base and have depending flanges 19 overlying the edges of the latter to receive the bolts 17 therethrough; the flange of the inner plate terminating even with the inner edge of the rim 10 while the flange of the outer ring projects so as to overlap the outer face of the outer disk 4 of the wheel body. Bolts 20 are extended through the flange portion of ring 15, and outer edges of disks 4 and 5 for the purpose of holding the demountable rim on the wheel.

Formed about the edges of the inner face of the tire base are ribs 23 and 24, and fitted between these against the base ring is a rubber cushinoning ring 25, having its inner surface beveled to fit the beveled rim of the supporting disk. This ring 25 serves as a means of absorbing shock and adds greatly to the resiliency of the wheel. It may be made as thick as is necessary to accomplish a desired result.

In order that the resiliency provided by the cushinoning ring may not be destroyed by the connection of the ring 15 to the wheel body, I have provided the bolts 20 with shoulders 28 adjacent their heads 29 which seat against the outer face of the disk 4 and provide that the two disks 4 and 5 may be drawn tightly together by the tightening of the nuts on the bolts without causing the heads 29 to tighten against the securing flange 19 of the outer ring 15. I also provide the ring flange 19 with apertures 30 which are larger than the shouldered portions of the bolts, but smaller than the heads, so that there can be movement of the ring relative to the bolts. This construction provides a secure connection without defeating the purpose of the cushioning ring.

The tire is equipped with the usual filling valve stem 35 which extends through an opening 36 through the rings 10 and 25 and the flange 8 and then outwardly where it is provided with a removable cap 37. Studs 38 are secured in the tire base to be projected into apertures in the rim 8 to prevent slippage of the demountable rim on the wheel.

Assuming that the parts of the wheel are so constructed and assembled, if it is desired to remove the rim from the wheel body the bolts 20 are first removed, this loosens the rim from the disk 4 so that by pulling forwardly the rim portion with the tire thereon may be demounted from the wheel. If it is then desired to remove the tire from the rim, the bolts 17 are removed which permits the retaining rings 15 and 16 to be detached from the tire base and the casing to be detached from the base.

Having thus described my invention, what I claim as new and desire to secure by Letters Patent, is:

1. A wheel of the class described comprising a body forming disk having a marginal portion forming a rim seat, a rim forming a tire base, a tire mounted on said rim, a cushioning ring fitted within the rim and demountably on the rim seat and means detachably securing the rim to the wheel body.

2. A wheel of the class described comprising a body forming disk with a marginal portion providing a rim seat, a rim, a tire mounted on the said rim, a cushioning ring secured within the rim and demountably fitted upon the rim seat, retaining rings removably secured to opposite sides of the rim to retain the tire thereon and means detachably securing one of said rings to the wheel body.

3. A wheel of the class described comprising a body forming disk having a marginal portion providing a rim seat, a rim enclosing the wheel having a dove-tailed rib centrally about its outer surface, a tire casing fitted about the ring with its edges engaging opposite sides of the dove-tailed rib, tire retaining rings secured to opposite sides of the rim to embrace the casing, a cushioning ring fitted securely within the rim and demountably upon the rim seat, and means securing the rim demountably to the wheel body.

4. A wheel of the character described comprising a hub, inner and outer face disks secured to the hub, the outer disk having a laterally turned marginal portion forming a rim seat, a rim forming a tire base, a tire fitted upon the rim, a cushioning ring fitted securely within the rim and demountably upon the rim seat, tire retaining rings fitted to opposite sides of the rim with the inner edge of one overlapping the outer body disk, bolts extended through said rim and rings to secure them functionally together, and other bolts extended through said disks and overlapped edge of the retaining ring to secure the rim upon the rim seat.

5. A wheel of the character described comprising a body forming disk having a laterally turned marginal portion forming an annular, beveled rim seat, a rim, a tire mounted on the rim, a cushioning ring fitted securely within the rim and having its inner surface beveled to demountably fit the rim seat and means securing the rim upon the rim seat which permits relative movement upon compression of the cushioning ring.

6. A wheel of the class described comprising a hub, a body forming disk secured to the hub having a laterally turned marginal portion forming an annular, beveled rim with an out turned flange at the inner edge of said seat, a rim enclosing the seat having ribs about its edges on the inner surface, and a dove-tailed rib centrally about its outer surface, a tire casing mounted on the rim with its edges fitted against opposite sides of the dove-tailed rib, a cushioning ring fitted within the rim between said ribs, and havings its inner surface beveled to demountably fit the rim seat, tire retaining rings fitted to opposite sides of the rim and bolts extended through said rings to detachably secure them to the rim; the outer ring having its inner edge overlapping the outer body disk and having apertures thereon, and bolts extended through said apertures and disks to retain the rim on the seat.

JEREMIAH HAYES.